United States Patent [19]

Hutchison

[11] Patent Number: 4,470,462

[45] Date of Patent: Sep. 11, 1984

[54] FOAM AND PARTICULATE MATERIAL WITH STEAM FOR PERMEABILITY ALTERATION IN SUBSURFACE FORMATIONS

[75] Inventor: Stanley O. Hutchison, Bakersfield, Calif.

[73] Assignee: Chevron Research Company, San Francisco, Calif.

[21] Appl. No.: 545,015

[22] Filed: Oct. 24, 1983

Related U.S. Application Data

[63] Continuation of Ser. No. 289,550, Aug. 3, 1981, abandoned.

[51] Int. Cl.³ .................. E21B 33/138; E21B 43/24
[52] U.S. Cl. .................................. 166/292; 166/272; 166/303
[58] Field of Search ............... 166/269, 272, 281, 288, 166/292, 303

[56] References Cited

U.S. PATENT DOCUMENTS

| | | | |
|---|---|---|---|
| 2,264,037 | 11/1941 | Haskell | 166/292 X |
| 3,349,843 | 10/1967 | Huitt | 166/281 X |
| 3,412,793 | 11/1968 | Needham | 166/272 X |
| 3,464,491 | 9/1969 | Froning | 166/272 X |
| 3,603,398 | 9/1971 | Hutchison | 166/305 R |
| 3,993,133 | 11/1976 | Clampitt | 166/272 |
| 3,994,345 | 11/1976 | Needham | 166/303 |
| 4,068,717 | 1/1978 | Needham | 166/272 |
| 4,072,191 | 2/1978 | Clampitt | 166/292 X |
| 4,086,964 | 5/1978 | Dilgren et al. | 166/272 |

FOREIGN PATENT DOCUMENTS 1031696  5/1978  Canada .................. 166/288

*Primary Examiner*—George A. Suchfield
*Attorney, Agent, or Firm*—D. A. Newell; E. J. Keeling; L. S. Gruber

[57] ABSTRACT

A method is disclosed for altering the permeability of a gravity override path through a subsurface earth formation resulting from hot fluid (steam) injection into the subsurface formation. The method includes adding selected sized particulate material to a foam and injecting the foam into the gravity override path to deposit the particulate material thus altering the permeability in the path. The method may include the use of a noncondensible gas in the foam as well as a variety of combinations of the hot fluid injection and foam plus particulate material injection to maximize the sweep efficiency of the hot fluid injection into the subsurface formation.

11 Claims, No Drawings

FOAM AND PARTICULATE MATERIAL WITH STEAM FOR PERMEABILITY ALTERATION IN SUBSURFACE FORMATIONS

This is a continuation of application Ser. No. 289,550, filed Aug. 3, 1981, now abandoned.

BACKGROUND OF THE INVENTION

1. Field of the Invention

This invention relates to a steam-drive process for producing viscous petroleum crude from a permeable earth formation and more particularly to a method for treating a subsurface permeable formation containing viscous petroleum crude during a steam-drive process to improve the sweep efficiency of the steam-drive process.

2. Prior Art

It has been known to steam-flood an earth formation containing viscous petroleum crude to increase the mobility of the crude and cause it to move to a producing location. In some steam-flood field procedures the same well is used for both steam injection and for crude production and other field procedures use separate injection and production wells spaced from each other through the petroleum containing formation. A variety of injection procedures using a variety of injection materials have been proposed most of which have the objective of increasing the efficiency of production of the petroleum crude at the producing well.

In the particular case of steam injection into and injection well with the objective of moving crude to a producing well, it has been observed that the efficiency of the sweep of crude from the formation is diminished, sometimes to zero, when injection steam breaks through into the producing well. This condition is known as gravity override. Hot water which separates from the injected steam tends to sweep through the bottom portions of the heated interval while the steam vapor tends to override the hot water, because of differences in densities of the two fluids. As the hot water flows through the reservoir, heat is transferred to the rock and reservoir fluids. This results in a temperature transition from the hot water bank to cooler water ahead of the bank. In practice, this means an ordinary waterflood precedes the warm and hot water banks which causes a gradual reduction in residual oil saturation with distance from the injector. Because of the unfavorable viscosity ratio the efficiency of this waterflood will be poor. However, good recovery efficiency with steam in the upper portion of the heated interval will result in significant reductions in residual oil saturations. These differences in oil saturations will adversely affect the naturally-poor relative permeability ratio of steam and water. As a result, injected steam will tend to prematurely breakthrough into the offset producing wells without sweeping the entire heated interval. If this condition is permitted to continue, the production of reservoir fluids can drop to zero and only steam and water will be produced at the producing wells.

In steam flooding, the rate of steam injection is initially high so as to minimize heat losses to the cap and base rock with time. Frequently, this procedure results in the development of a highly permeable and relatively oil-free channel between injector and producer. Many times this channel develops near the top of the oil bearing rock. In this case, much of the injected heat is conducted to the cap rock as a heat loss, rather than being conducted to oil bearing sand where the heat is needed. In addition, the steam cannot displace oil efficiency since little oil is left in the channel. Consequently, neither the gas drive from the steam vapor nor the convective heat transfer mechanisms work efficiently. This is why as a steam flood breaks through into the producing well it results in much lower oil recovery.

Further, while some graphic illustrations of steam profiles between injection wells and producing wells represent that steam and hot fluids start all along the injection well, rise toward the top of the producing interval in the direction of the producing well and drop down near the producing well, it is the present inventor's belief that such a profile is inaccurate. More than likely, once the steam has risen through the producing interval it will not drop down into the producing well when steam breakthrough occurs. This condition has been shown to exist by temperature profiles along a producing well. Such a condition further reduces the sweep efficiency of such a steam injection method.

It has been suggested to inject a blocking barrier into the formation above the steam injection to reduce the loss of steam through the breakthrough path. One such barrier is a foam as suggested in U.S. Pat. No. 3,412,793 issued to R. B. Needham on Nov. 26, 1968 for Plugging High Permeability Earth Strata. The highly permeable formation is temporarily plugged with a foam by introduction of steam and a foaming agent into the formation whereby a foam having steam as its gaseous phase is formed and, upon condensation of the steam due to loss of heat, the foam collapses. A similar procedure is shown in U.S. Pat. No. 4,086,964 issued to R. E. Dilgren et al on May 2, 1979 for Steam-Channel-Expanding Steam Foam Drive. That patent suggests the addition of a noncondensible gas to the foam and injection into the steam channel to provide foam and a relatively high pressure gradient within the channel. Neither of these patents are believed to provide the relatively permanent solution to the gravity override breakthrough problems as is disclosed in the present application.

SUMMARY OF THE INVENTION

It is herein proposed to alter the gravity override path within the formation by carrying into the formation finely divided particulate materials which will alter the permeability of the override path and thus encourage the flow of injection steam or hot fluids into the formations where reservoir fluids remain. The intention of the injection procedures is to recognize gravity override breakthrough and to then inject materials into that breakthrough path which will alter the permeability therein and then return to the injection procedure to reestablish communication between the injection fluids and the reservoir where the desired reservoir fluids remain. The particulate material is carried into the permeability override path with a low velocity fluid thus accomplishing the desired permeability alteration without damage to the well bore liner and without "bridging" in the formation.

Accordingly, it is an object of the invention to provide a novel and improved process for producing petroleum crude from a subsurface earth formation using a combined series of steps of injecting steam or other hot fluids, injecting a stable foam material, and mixing particulate material with said foam and pumping said foam and particulate material into the subsurface formation to control the permeability of the formation into which said foam have been injected.

Further objects and features of this invention will be readily apparent to those skilled in the art from the following specifications describing a preferred embodiment of the invention.

DETAILED DESCRIPTION OF THE INVENTION

It has been demonstrated that particulate material can be carried from the earth's surface to a subsurface location with a vehicle of stable foam generated at the earth's surface.

It has also been demonstrated that the foam and the particulate material may be carried back into the formation for the purpose of propping the formation as for instance when foam plus particulate material are used in a formation fracturing procedure. It has also been demonstrated, as described in U.S. Pat. No. 4,086,864 and 3,412,793, that foam may be used to provide a temperature block in the formation to prevent steam from overriding into more permeable formations and to prevent heat from being lost into the formations above the zone of interest.

In accordance with one field procedure of the present invention, a conventional steam flood of a formation is accomplished with a steam injected into the formation of interest and production accumulated at a producing well spaced from the injection well. After steam has been injected for a long enough interval to cause the crude to become mobile and to move into the producing well, it is expected that a steam breakthrough will occur into the producing well and that breakthrough will be evidenced by a substantial change in the volume of steam vapor produced in the producing well. When that event has occured, a foam plus a small particulate material is injected into the formation through the zone where the crude has been produced into the producing well and the particulate material is carried into the permeability paths within the formation. The foam is then permitted to collapse and the particulate material is retained in the formation causing the permeability to be substantially blocked because of the grain size of the material carried with the foam.

Steaming of the formation is then reinitiated and continued production is developed into the producing well. On the event of another steam breakthrough, the same procedure with particulate material and foam is performed and the permeable path of the producing formation are again blocked to prevent the steam from flowing through the formation in paths not in contact or not containing petroleum crude.

The particulate material carried with the foam is preferably graded from an analysis of the actual formation involved and the particle sizes of the added material are specifically designed to accomplish the desired permeability modification in the producing formation. Samples are taken in conventional sidewall sampling procedures and analyses are run in conventional techniques to determine the grain sizes of the formation and the grain sizes of the particulate material to be added to the flood.

Foam quality is important to the invention here disclosed. Foam is formed by mixing together a foamable solution and a gas. The foam must be a relatively stable foam capable of carrying the material downhole. A suitable foam forming appartus is disclosed in U.S. Pat. No. 3,603,398, Stanley O. Hutchison and John C. McKinnell, issued Sept. 7, 1971 for Method of Placing Particulate Material in An Earth Formation With Foam. That patent also disclosed suitable mechanism for combining the particulate material with the foam solution. The foam is formed by bringing a foamable solution of a surfactant and a gas together. The preferred foam is an aqueous air foam. Water and, if desired, a suitable stabalizing agent are mixed to produce a foamable solution. Suitable foam and other specific surfactants which go into the foamable solutions that make them are described in detail in U.S. Pat. No. 3,463,231 to S. O. Hutchison, et al issued Aug. 26, 1969 for Generation And Use Of Foamed Well Circulation Fluids. The disclosure of that patent is incorporated herein by reference. A preferred foam for use in this invention is a $C_{11}$ to $C_{14}$ alkyl benzene sulfonate (ABS) preferably the ammonium salt. The ABS should be added to water to form a foamable solution in an amount of between 0.5 to 1.0 parts per weight per hundred parts water. The foamable solution is mixed with air in a gas-to-liquid volume ratio of between 3 to 50 standard cubic feet to one gallon. Superior results are obtained when the foam has a gas-liquid volume ratio between 10 to 20 standard cubic feet to one gallon.

It is preferable to form the foam with a noncondensable gas. Nitrogen is such a useful gas. Other useful gases can be exhaust gases of a steam generator. One such possibility is the use of a downhole steam generator with the exhaust gases from that generator being used as the noncondensible gaseous material for generating the foam. It is important to the wellbore environment that the gas material used in forming the foam be noncorrosive and in that respect low in oxygen. If exhaust gases are used, it is necessary to adjust the pH of those gases in order to avoid having an acidic pH in the injection materials. It has been discovered that the injection of high pH solutions with steam can cause severe damages to the sand grains and quartz grains in a producing formation and in that respect serious damage can be done to the permeability of the formation.

The grain size of the particulate material added to the foam should be, as previously described, graded in accordance with the analysis of the formation materials. One such material is silica flour which is a fine grain material having grain sizes in the range of 100 to 600 mesh including clay minerals and clay size materials. The preferred grading is: the particulate size range of the added particulate material should be such that the 10% size of the particulate material is between 6 and 100 times smaller than the 90% size of the formation materials. In that the added particulate materials are intended to control the permeability of the swept portion of the subsurface reservoir, it is desirable that the grain sizes of the particulate material be preferably on the small size so as to insure a proper distribution into the permeable formation. The foam will carry the particulate material into the permeable paths within the formation and, with control of the injection pressure on the foam the particulate material will be deposited as the foam collapses with the formation.

It is further important that the pressure used in injecting the foam plus particulate material is maintained below the pressure that would be expected to fracture the subsurface formation. Fracturing of the formation is not intended with the present invention, it is the control of the permeability of the formation rather than the opening of permeable paths that is desired.

During the time that the particulate material is being added into the formation, the steam injection process may continue. For that reason the foam that is formed must be able to withstand the temperature of the steam that is used in heating the subsurface formation.

In accordance with the present invention, a steam override zone in the subsurface which is caused by the opening of highly permeable paths as the heated and mobile crude is moved out of the formation can be controlled by the injection of foam-containing sand and/or particulate materials graded to the size of the permeability paths within the formation to control and alter the permeability paths. An alteration in a steam override permeability path can be identified in the fluids produced at a producing well as the ratio of oil and water changes from that which was observed which indicated the steam override. In that respect, a steam breakthrough is evidenced by an increase in the volume of steam vapor produced. An alteration of the permeability path accomplished in accordance with the present invention is evidenced by a decrease in the volume of steam vapor produced. Once the permeability has been altered, the injection well may be returned to a steam injection condition and the crudes within the subsurface formation can again be heated as the steam heating fluid is injected into the formation. If and when another steam override occurs, the formation may then again be treated with the foam plus particulate materials to accomplish another alteration of a newly developed permeability path. Continuous monitoring of the produced fluids for oil and water content and temperature can permit the present invention to be used to improve the sweep efficiency of a steam flood operation.

The invention described herein may be equally applicable to a steam flood operation using an injection well and a producing well or a single well used both for injection and for production frequently referred to as huff-and-puff. Upon the occurence of a reduction in back pressure in the subsurface formation, it can be assumed that a permeability path has been opened in the subsurface permitting the steam to be diverted into formations where the in-place crude has already been moved. When that is observed, the formation may be foamed with the foam plus particulate material to place the particulate material in the permeability path and thus reduce the diversionary route through the formation.

While certain preferred embodiments of the invention have been specifically disclosed, it should be understood that the invention is not limited thereto as many variation will be readily apparent to those skilled in the art and the invention is to be given its broadest possible interpretation than the terms of the following claims.

I claim:

1. A method of treating a permeable earth formation containing a viscous petroleum crude from within a wellbore penetrating said earth formation comprising the steps of:

(a) injecting steam down said wellbore and into said formation to heat and mobilize said viscous petroleum crude;
   (b) preparing a stable foam at the earth surface;
   (c) mixing finely divided particulate material with said foam;
   (d) alternating said injecting step with the step of pumping said stable foam mixed with finely divided particulate material down said wellbore and into said formation in a position along said wellbore to prevent gravity override of said steam into said formation; and
   (e) positioning said finely divided particulate material in said permeable formation as said mobilized viscous crude moves in response to said injected steam to alter the permeability of said formation where said finely divided particulate material is positioned.

2. The method of claim 1 wherein said steam injected down said wellbore is injected until a steam gravity override occurs around said wellbore within said formation and then said foam and particulate material are injected into said steam gravity override zone as a permeability adjuster for said formation.

3. The method of claim 2 wherein said steps of injecting steam until a gravity override occurs and said injection of said foam and particulate material are alternated to provide for a continuing permeability adjustment of said formation as said mobilized viscous crude moves in response to said injected steam.

4. The method of claim 1 wherein said foam is prepared using a foaming agent and an inert gas.

5. The method of claim 4 wherein said inert gas is exhaust gas from a surface steam generator.

6. The method of claim 4 wherein said inert gas is noncondensible at subsurface temperatures and pressures during the said steam injection process.

7. The method of claim 1 wherein said stable foam has a gas-to-liquid volume ratio of between 3 and 50 to 1 standard cubic feet per gallon and is formed from a foamable solution containing between 0.5 and 1.0 parts per weight surfactant per 100 parts liquid.

8. The method of claim 1 wherein said particulate material is a graded mixture with size distribution determined from analysis of the subsurface formation being treated.

9. The method of claim 8 wherein the 10% size for the particulate material ranges from between 6 times smaller and 100 times smaller than the 90% size of the subsurface formation grain sizes.

10. The method of claim 9 wherein said particulate material is sand.

11. The method of claim 9 wherein said particulate material is silica flour.

* * * * *